July 14, 1953     O. LECANU-DESCHAMPS     2,645,391
REMOVABLE LUGGAGE CARRIER
Filed Dec. 2, 1949     2 Sheets-Sheet 2
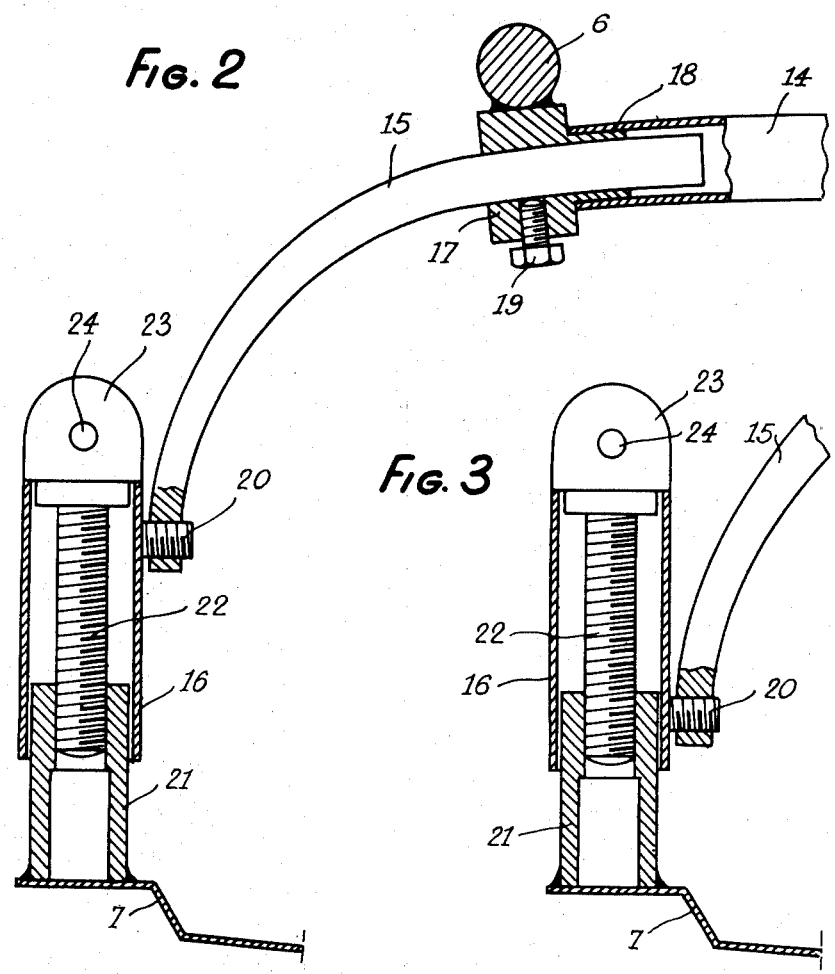
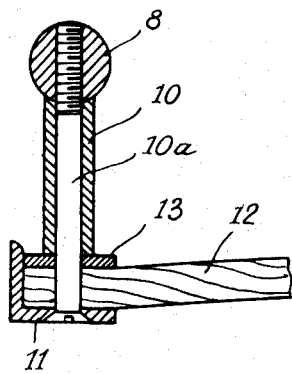
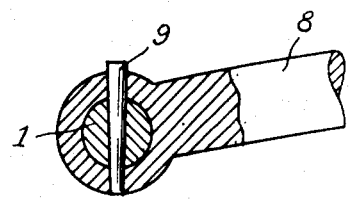
INVENTOR:
Olivier Lecanu-Deschamps
by: *[signature]*
Attorney.

Patented July 14, 1953

2,645,391

UNITED STATES PATENT OFFICE 2,645,391

REMOVABLE LUGGAGE CARRIER

Olivier Lecanu-Deschamps, Levallois-Perret, France

Application December 2, 1949, Serial No. 130,646
In France October 3, 1949

6 Claims. (Cl. 224—42.1)

This invention relates to removable luggage-carriers adapted for attachment upon the tops of automobiles, and more particularly to such luggage-carriers of the type having spaced points of support on the top of an automobile and provided with laterally-projecting retaining means adapted to engage lateral projections each side of the automobile body, for instance the top rebate or fillister of the doors of the car.

It is a first object of my invention to provide an improved luggage-carrier for automobiles of the type described which is more easily detachable into its constituent elements in order to facilitate packing and shipment thereof.

Another object is to provide such an improved luggage-carrier which is more readily and perfectly adaptable to suit various sizes and shapes of automobile tops depending on the particular type of car to which it is to be applied.

A related object is to provide a luggage carrier for an automobile top in which the said laterally-projecting retaining means are variably positionable relatively to the actual luggage-carrier structure in a direction parallel with the longitudinal axis of the car, and also in which said engaging means are preadjustable in vertical position relatively to said structure.

Another object is to improve the manner in which the luggage carrier structure or grid is supported on the automobile top and the load distribution thereon, while improving the appearance of the luggage-carrier assembly.

Further objects and advantages and the characteristic features of the invention will appear from the ensuing disclosure and the accompanying drawings, which relate to a preferred form of embodiment of my invention, selected merely for purposes of illustration and not of limitation. In the drawings:

Fig. 2 is a fragmentary vertical cross-section on line II—II of Fig. 1;

Fig. 3 is a similar view of part of the structure shown in Fig. 2 but showing a different preadjusted position thereof; and Figs. 4 and 5 are fragmentary sections on an enlarged scale, on the line IV—IV and V—V respectively of Fig. 1.

Figure 1:
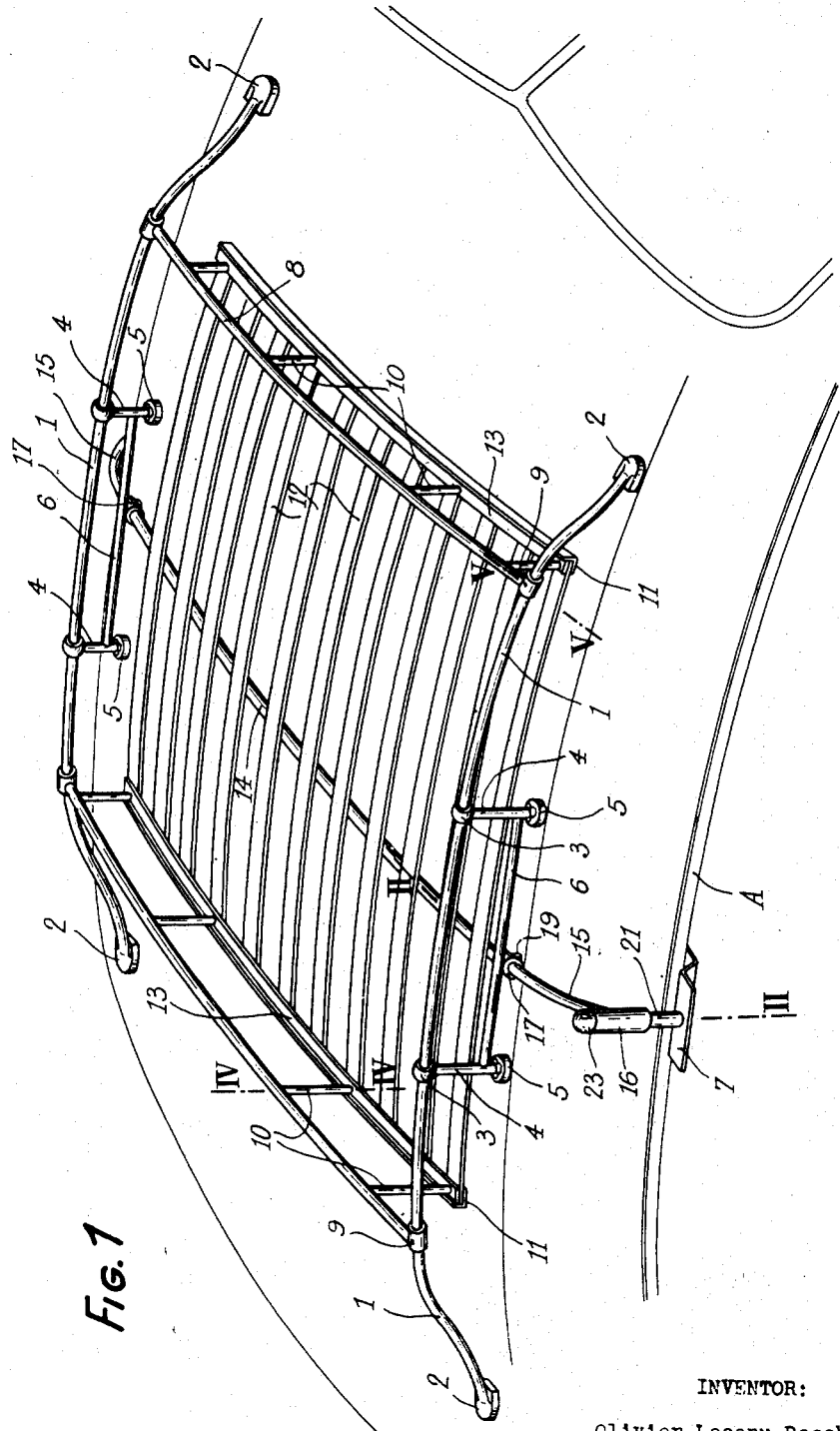
Fig. 1 is an isometric view of an assembled luggage-carrier according to my invention as mounted on the top of an automobile.

As shown in the drawings my improved luggage-carrier is of the general well-known type comprising a grid structure resting on the top of the car at least four points of support and retained applied thereagainst by laterally projecting lugs adapted to engage suitable lateral projections on each side of the body of the car, for example, as shown in Fig. 1, the top rebate or fillister A of the doors, said engaging lugs being provided at the opposite ends of a tie-rod connected with the luggage-grid and provided with stretching or tightening means, whereby said luggage grid may be clamped down at said points of support thereof with any desired degree of tension.

In the arrangement shown in the drawings, the luggage-carrier structure is fully detachable into its constituent elements. For this purpose it comprises two parallel side-members 1 so conformed as to include a substantially straight horizontal portion terminating at each end in downwardly-inclined end-portions provided at their ends with supporting elements or shoes 2 preferably fitted with resilient material such as rubber. The straight section of each side-member 1 is freely passed through an eye 3 formed at the top of each one of two posts 4 provided at their base with a supporting shoe 5 as of rubber or the like, both posts at each side of the structure being interconnected with an auxiliary side-member 6 secured thereto at each end. As described later, it is these auxiliary side-members 6 that the attaching lugs 7 with the related stretching means are secured. With the main side-members 1 cross-members 8 are further connected, each said cross-member interconnecting the adjacent ends of the respective main side members. As shown in Fig. 5, the cross-members 8 are at each end formed with an eye through which the main side members 1 are passed and in which they are suitably secured as with a taper cotter pin 9.

The cross-members 8 support the actual luggage-carrying structure or luggage-grid through the medium of a set of posts 10 depending from said cross-members at spaced points of their length. Said posts 10 (Fig. 4) are hollow and serve as tubular spacing means for screws 10a rising up from an angle element 11 into threaded engagement with the corresponding cross-member 8. The horizontal web or flange of the angle 11 serves as a base support for the adjacent extremities of a set of slightly flexible or resilient slats 12, which may be made of wood, comprising the luggage-grid proper. A presser strip 13 engages the top surfaces of the said extremities of the slats. It will be seen that when the screws 10a are turned up the ends of the slats 12 are tightly blocked between the horizontal flange of the angle 11 and the presser strip 13, which in turn is applied against the bottom end of the spacer tube 10.

Completing the luggage-grid is a central tubular cross-member 14 into each end of which is fitted a spigot 15 supporting the tension unit 16 to the base of which the attaching lug 7 is attached. The tubular cross-member 14 is removably assembled with the auxiliary side-members 6 through the medium of a socket assembly 17 (Figs. 1 and 2) welded to said auxiliary side-members 6 and provided with a tubular projection 18 adapted to be press-fitted into the end of the tubular cross-member 14. The spigot 15 is in turn adapted to be inserted a smooth fit into said tubular projection 17 and blocked in any desired position therein by means of a set screw 19. The other or outer end of the spigot 15 has removably secured to it the tension unit 16 constituted as follows:

The main body 16 of said tension unit is in the form of a sleeve having a threaded stud 20 outwardly projecting therefrom near one of its ends. The threaded stud 20 is adapted to be screwed into a complementarily threaded hole formed in the said outer end of the spigot 15. Within the sleeve 16 a bushing 21 is mounted for sliding movement therein and it is to the base of this bushing 21 that the previously mentioned retaining lug 7 is secured. The lug 7 is preferably bent substantially as shown in order to conform to the contour of the usual rebate or fillister over the top of the door of the car.

The bushing 21 is axially formed with a threaded hole in which is engaged the end of a screw 22 formed at its top with a head 23 engaging the top end surface of the sleeve 16. The head 23 may be formed in various ways to enable ready actuation of the screw. As shown the head 23 is substantially of semi-spherical shape so as not to project laterally beyond the sides of the sleeve 16, and said head is formed with a hole 24 for actuation thereof with a suitable actuating tool.

It will be seen from the above description that the luggage-carrier of this invention is entirely detachable into substantially straight elements, namely: the side-members 1; the posts 4 which are freely engaged around said side-members; the auxiliary side-member 6 carrying the sockets 17 and removably secured to the said posts; the cross-members 8 removably secured to the side members 1 and pinned in place as shown in Fig. 5 and described hereinabove; the posts 10 secured to said cross-members with the screws 10a; the angles 11 and presser strips 13; the slate 12; the tubular cross-member 14 press-fitted into the socket units 17, 18; the spigot 15; the tension units 16 comprising in turn the detachable elements 16, 23 and 21–7. And it will appear from the foregoing description that all the above elements may be assembled and disassembled very quickly and without requiring the use of any tool other than a screw-driver.

The combination of the side-members 1 with the auxiliary side-members 6 and posts 4 provide on each side of the structure four points of support, viz.: the points of support 5 serving for the actual support of the luggage carrier on the roof, that is, cooperating directly with the spigot 15 and tensioning means 16, while the end supporting points 2 merely provide auxiliary points of support or fulcrums adapted, upon tension being applied, very easily to conform with the particular curvature of the top surface of the car in connection with which the device is employed, as the curved end sections of each side member 1 can very easily undergo slight alterations in their curvature to allow for such varying curvatures of the supporting surfaces. Moreover, such subdivision of the supporting points makes it possible to shift the whole luggage grid structure suspended from the side members 1 and cross members 8 bodily to front or rear relatively to the posts 4 and their supporting shoes 5, this providing an additional possibility for adapting a given luggage-carrier to various types of vehicles, owing to the variable position of the attaching lugs 7 lengthwise of the luggage-grid.

Moreover, as shown in Figs. 2 and 3, a supplemental means of vertical preadjustment is provided by the possibility of reversing the position of the sleeve 16 over the bushing 21 and screw 22; the position of the threaded stud 20 being, as previously stated, towards one end of the sleeve 16, it will be seen that it is merely necessary to pivot the sleeve 16 through 180° about the stud 20 threaded into its hole in the spigot 15, to alter the relative vertical position of the attaching lug 7 with respect to the end of the spigot, and also to the socket 17 and cross-member 14. This constitutes in effect a preadjustment, prior to the turning up of the screw 22, by which a given luggage carrier assembly may be made to suit varying heights of the top surface of the car above the fillister or other suitable projection on the sides of the car.

It will be understood that while I have described and illustrated a preferred structural embodiment of my invention, various omissions, alterations and additions may be made in the details described and shown without exceeding the scope of the invention as defined in the ensuing claims.

What I claim is:

1. An automobile-attachable luggage carrier which comprises in combination: a frame including main side members and cross members, a luggage grid depending from said cross members, said main side members having downwardly inclined end parts extending beyond said cross members at each end thereof into auxiliary supporting engagement with an automobile top surface, a pair of posts slidably mounted on and depending from each main side member, a supporting shoe at the base of each side post for main supporting engagement with said top surface, an auxiliary side member interconnecting said posts on each main side member, a member cross-connecting the opposite auxiliary side members and extensions at each end of said cross-connecting member extending laterally and downwardly into retaining engagement with side projections of said automobile, and vertically adjustable means for varying the pressure of said retaining engagement.

2. In an automobile luggage-carrier in combination, a pair of main side members having downwardly curved end-portions and resilient supporting shoes at the ends thereof engaging the top surface of said automobile, a pair of cross-members inter-connecting said main side members removably secured therewith inwardly of said end-portions, a luggage grid depending from said cross members and comprising a set of parallel spaced slats, a pair of upwardly-inwardly facing channel elements underlying, and vertically spaced from, each cross memebr and supporting the respective ends of said slats on the horizontal flange thereof, a presser strip overlying the ends of said slats in contact with the top surface thereof in each of said channels, screw means projecting up through said horizontal flange of each channel extending through corresponding holes in said flange and said presser strip into threaded engagement in corresponding threaded holes of said cross-member, and a spacer tube inserted on each said screw between said presser strip and said cross member, and a slidable intermediate supporting and retaining structure comprising opposite means slidably connected with each of said side members and providing with supporting shoes at the base thereof providing further points of support for said frame, and a member cross-connecting said opposite means underlying said slats in supporting engagement with the under surface thereof, and extensions at each end of said cross-connecting member extending laterally and downwardly into retaining engagement with side projections of said automobile and vertically adjustable means for varying the tension of said retaining engagement.

3. In an automobile luggage carrier in combination, a frame with main cross members and side members, a luggage grid depending from said cross members, said main side members having downwardly curved end portions with resilient supporting shoes at the ends thereof, a movable intermediate supporting and retaining means which includes opposite means slidably connected with said respective side members and further resilient supporting shoes at the base thereof, and a tubular member interconnecting said opposite means movably underlying said luggage grid in supporting relation with the under surface thereof, an arcuate spigot inserted into each end of said tubullar cross-member for settable sliding positional adjustment therein, each spigot having an outwardly and downwardly extending arcuate portion, and adjustable retaining units, each removably secured to said outer end of each spigot at one point of said unit and having at the bottom point of said unit an inturned projection adapted for retaining engagement with a side projection of said automobile, and adjusting means for varying the effective length of said units between both said points thereof.

4. An automobile-attachable luggage carrier as in claim 3 wherein said retaining unit is adapted to be mounted in a selected one of two conditions, in one of which the initial effective length between said two points is greater than in the other.

5. An automobile-attachable luggage carrier as in claim 4 wherein said retaining unit comprises a reversible open-ended sleeve, a screw stud projecting from a point of said sleeve nearer to one end thereof than to the other end and adapted for threaded engagement with a threaded hole in said outer end of the related spigot, a bushing freely slidable within said sleeve and projecting beneath the under end thereof, a retaining lug projecting inboard from the under end of said bushing adapted for retaining engagement with a projection on the related side of the automobile, internal screw threads towards the top of said bushing and a screw having an enlarged actuating head at its top, said head engaging the top end surface of said sleeve and said screw extending down through said sleeve into threaded engagement with said screw threads in said bushing.

6. An automobile-attachable luggage carrier which comprises in combination a frame including main side members with downwardly inclined end portions and resilient supporting shoes on the ends thereof providing auxiliary and supporting means on an automobile top, a pair of cross members removably secured across said main side members inwardly of and adjacent said end portions, a luggage grid with parallel spaced slats extending parallel with said side members and removable screw means for supporting said grid at the ends thereof in depending relation from and vertically spaced beneath said cross members, a pair of posts having their top ends slidable over each one of said main side members and having resilient supporting shoes at their base for main supporting contact with said automobile top, an auxiliary side member having its ends removably rigidly secured to one of said posts on each of said main side members, a socket secured to each of said auxiliary side members at the bottom and intermediate the ends thereof, a tubular extension projecting from each socket inwardly of said frame, a tubular cross-connecting member having each end press-fitted about the tubular extension of a respective socket and movably underlying said slats in supporting contact with the under surfaces thereof; a spigot having its inner end projecting inwardly through said socket and said tubular extension, for sliding adjustment therein and a set screw in said socket engaging the side of said spigot therein for positional adjustment, said spigot including an arcuate outer portion projecting outwardly and downwardly, and adjustable retaining units each removably secured to said outer end of each spigot at an upper point of said unit and having at a bottom point thereof an inturned projection for engagement with a side fillister of the automobile, and adjusting means for varying the effective length of said unit between said points thereof.

OLIVIER LECANU-DESCHAMPS.

References Cited in the file of this patent

UNITED STATES PATENTS

| Number | Name | Date |
| --- | --- | --- |
| 2,109,571 | Le Boeuf | Mar. 1, 1938 |
| 2,444,201 | Lecanu-Deschamps | June 29, 1948 |
| 2,475,903 | Klas | July 12, 1949 |

FOREIGN PATENTS

| Number | Country | Date |
| --- | --- | --- |
| 685,786 | France | Apr. 7, 1930 |
| 216,092 | Switzerland | Nov. 14, 1941 |
| 117,226 | Australia | May 4, 1943 |